United States Patent [19]

Iseda et al.

[11] 3,905,945

[45] Sept. 16, 1975

[54] PREPARATION OF OXAZOLIDONE POLYMERS IN THE PRESENCE OF A MAGNESIUM HALIDE/PHOSPHINE OXIDE COMPLEX

[75] Inventors: Yutaka Iseda, Tachikawa; Motozumi Kitayama, Kodaira; Fumio Odaka, Kawagoe; Shiro Anzai, Higashi-Murayama, all of Japan

[73] Assignee: Bridgestone Tire Company Limited, Tokyo, Japan

[22] Filed: Apr. 9, 1973

[21] Appl. No.: 349,176

[30] Foreign Application Priority Data

Apr. 14, 1972  Japan.............................. 47-36936

[52] U.S. Cl. ... 260/77.5 R; 252/429 R; 260/2.5 AB; 260/2.5 AC; 260/77.5 AB; 260/77.5 AC; 260/551 P; 260/606.5 P

[51] Int. Cl.[2]..................... B01J 31/18; C08G 18/00; C08G 18/16; C08G 18/18

[58] Field of Search ... 260/77.5 R, 75 NB, 77.5 AB, 260/77.5 AC, 75 NC, 2.5 AC, 551 P, 606.5 P; 252/429 R

[56] References Cited

UNITED STATES PATENTS

| | | | |
|---|---|---|---|
| 3,506,690 | 4/1970 | Normant et al. | 260/551 P |
| 3,687,897 | 8/1972 | Clarke | 260/77.5 AB |
| 3,702,839 | 11/1972 | Glasgow et al. | 260/77.5 AB |
| 3,721,650 | 3/1973 | D'Alelio | 260/77.5 R |

Primary Examiner—H. S. Cockeram
Attorney, Agent, or Firm—Stevens, Davis, Miller & Mosher

[57] ABSTRACT

A process for preparing oxazolidones is provided by reacting an epoxide with an isocyanate in the presence of a catalytic amount of a magnesium halide/phosphine oxide complex. The reaction products thus produced can be used in a variety of applications. The polyoxazolidones obtained from polyepoxides and polyisocyanates can be used as liquid rubber materials, high temperature resistant resinous materials and the like.

11 Claims, 1 Drawing Figure

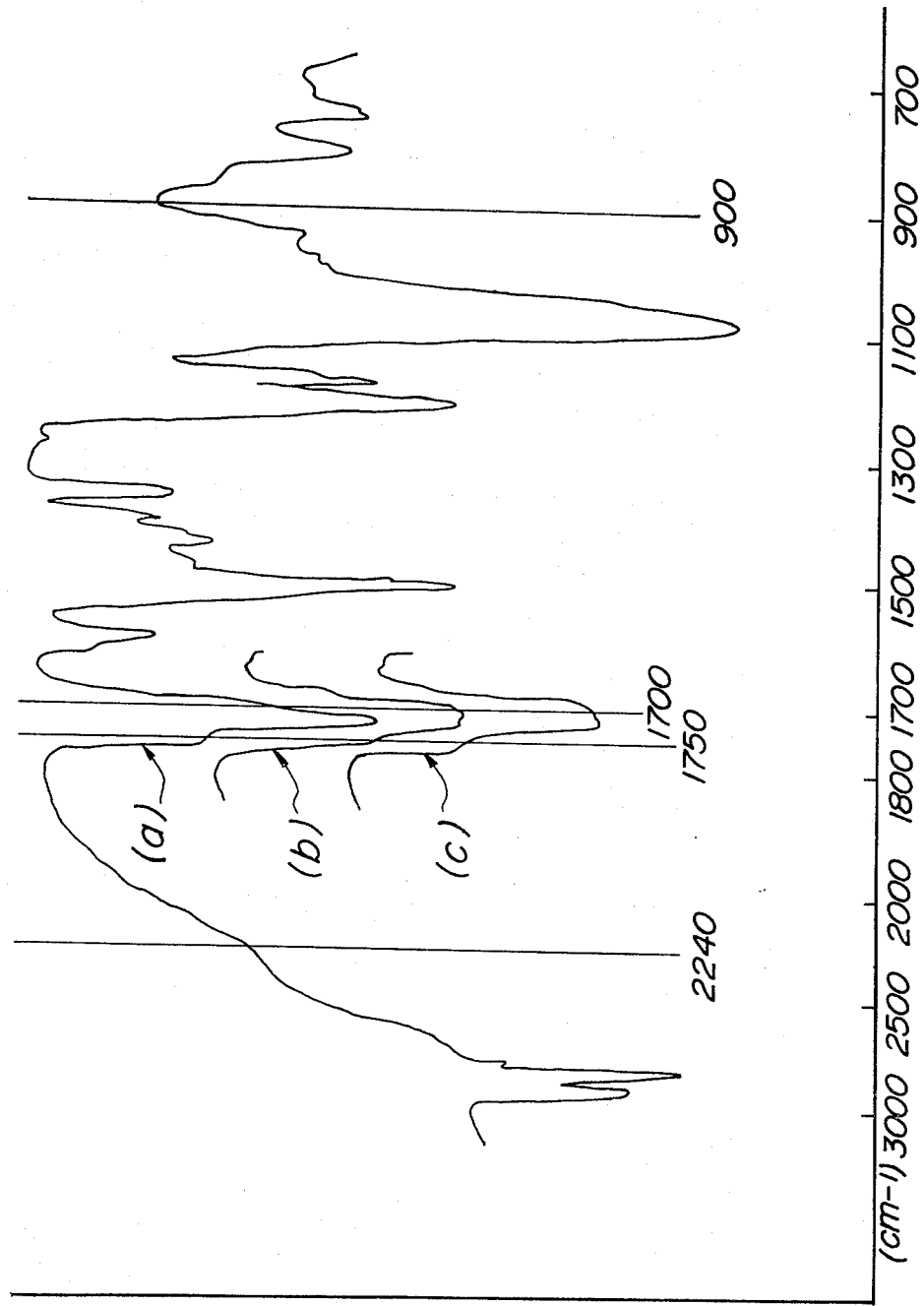

PREPARATION OF OXAZOLIDONE POLYMERS IN THE PRESENCE OF A MAGNESIUM HALIDE/PHOSPHINE OXIDE COMPLEX

The present invention relates to a process for the preparation of oxazolidones. In one aspect it relates to a novel catalyst for use in the condensation addition of an epoxide with an isocyanate.

The preparation of oxazolidones by the condensation addition of the epoxides with isocyanates is described in the prior literature. For example, U.S. Pat. No. 3,020,262 discloses such a reaction in which quaternary ammonium halides are utilized as the catalyst. However, the process is not entirely satisfactory since the reaction rate is slow as a result of the limited solubility of the catalyst and the reaction is accompanied with a side reaction, such as the isocyanurate formation. Tetrahedron Letters, No. 12, p. 809 (1971) describes that the reaction rate is increased by the use of an alkali metal halide/phosphine oxide complex as a catalyst which is fairly soluble. However, the process is also not entirely satisfactory, since the reaction is also accompanied with a side reaction, such as the isocyanurate formation.

It is desired to cause only the desired reaction selectively without causing such side-reactions and further the improvement of reaction completeness, increase of reaction rate, decrease of the necessary amount of catalyst, a moderate pot life particularly required in bulk reaction, a solubility of catalyst are demanded. Some of them may be satisfied in the case of the well known catalysts but there is no catalyst which satisfies all these requirements.

An object of the present invention is to provide an improved process of the preparation of oxazolidones.

Another object of the invention is to provide a novel catalyst for the condensation addition of an epoxide with an isocyanate.

Other and further objects and advantages of the invention will become apparent to those skilled in the art upon consideration of the accompanying disclosure.

Broadly speaking, the process of this invention for preparing oxazolidones comprises reacting an epoxide with an isocyanate in the presence of a magnesium halide/phosphine oxide complex as the catalyst. It has been discovered that the catalyst of this invention is more selective and active than the prior art catalysts. Furthermore, the present catalyst is more soluble in the reactants, resulting into a more efficient utilization of the catalyst.

For a better understanding of the invention, reference is made to the accompanying drawing, in which:

The attached drawing shows infrared absorption spectrums of the resulting products but (a) shows the infrared absorption spectrum of the oxazolidone compound obtained in Example 2 and (b) and (c) show those of the products in Comparative Examples 1 and 2, respectively.

The catalysts to be used in the present invention are phosphine oxide complexes of magnesium halide having a following general formula

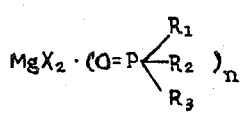

wherein X is a halogen atom, $R_1$, $R_2$ and $R_3$ may be the same or different and are an aliphatic or aromatic hydrocarbon or an amine which is disubstituted by an aliphatic hydrocarbon, containing from one to 20, inclusive, of carbon atoms and $n$ is any number within a range forming complex. As $MgX_2$, mention may be made of $MgCl_2$, $MgBr_2$ and $MgI_2$ and among them $MgCl_2$ is preferred and

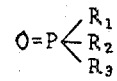

is, for example, hexamethylphosphoric triamide, tri-n-butyl-phosphine oxide, triphenylphosphine oxide, tri-2-ethyl-hexylphosphine oxide, tri-isopropylphosphine oxide, and among them hexamethylphosphoric triamide, tri-n-butylphosphine oxide and triphenylphosphine oxide are preferable. $n$ represents any numeral value within the range in which magnesium halide and phosphine oxide form a complex and is generally 1, 2, 3 or 4. The phosphine oxide complexes of magnesium halide are, for example, hexamethylphosphoric triamide complex of magnesium chloride, tri-n-butylphosphine oxide complex of magnesium chloride, tri-phenylphosphine oxide complex of magnesium chloride, tri-2-ethylhexylphosphine oxide complex of magnesium chloride and the like and the same complexes of magnesium bromide and the same complexes of magnesium iodide. Among them phosphine oxide complex of magnesium chloride is preferable.

The isocyanate compounds to be used in the present invention are, for example, aliphatic isocyanates, such as ethyl isocyanate, n-butyl isocyanate, n-hexyl isocyanate, hexamethylene diisocyanate, aromatic isocyanates, such as phenyl isocyanate, tolyl isocyanate, naphthyl isocyanate, tolylene-2,4-diisocyanate, tolylene-2,6-diisocyanate, diphenylmethane-4,4'-diisocyanate, diphenyldimethylmethane-4,4'-diisocyanate, phenylene-1,4-diisocyanate, 2,2',6,6'-tetramethyldiphenylmethane-4,4'-diisocyanate, diphenyl-4,4'-diisocyanate, diphenylether-4,4'-diisocyanate, 5-chlorotolylene-2,4-diisocyanate, 5-chlorotolylene-2,6-diisocyanate, 2,4-diisopropylphenylene-1,3-diisocyanate, m-xylene diisocyanate, p-xylene diisocyanate, $\alpha,\alpha,\alpha',\alpha'$-tetramethyl-p-xylene diisocyanate, 2,5-dichloro-p-xylene diisocyanate, tetrachloro-p-phenylene diisocyanate, tolylene-2,4-diisocyanate dimer, 1,5-naphthalene diisocyanate, polymethylenepolyphenyl isocyanate, alicyclic isocyanates, such as cyclohexane-1,4-diisocyanate, dicyclohexylmethane-4,4'-diisocyanate, 1,2,3,4,5,6-hexahydrodiphenylmethane-4,4'-diisocyanate and the like. Isocyanate terminated compounds obtained by reacting 1 mole of hydroxyl terminated compound, such as alcohol, glycol, triol with 2 mole of diisocyanate compounds and the like may be mentioned. The term "glycols" to be used herein are shown by the general formula OH—R'''—OH, for example, polyether series glycols, such as polypropylene oxide main chain type glycol, polytetrahydrofuran main chain type glycol, hydrocarbon main chain type glycols, such as polybutadiene glycol, polyisoprene glycol, butadiene/styrene copolymer glycol, butadiene/acrylonitrile copolymer glycol, isprene/styrene copolymer glycol, polyester main chain type glycol, polycarbonate main chain type glycol, aromatic series diols, such as bisphenol A, halogen substituted bisphenol A, hydroquinone, resorcinol and the like. The diisocyanate compounds are, for example, tolylene-2,4-diisocyanate, tolylene-2,6-diisocyanate, diphenylmethane-4,4'-diisocyanate, diphenyldimethylmethane-4,4'-diisocyanate, phenylene-1,4-diisocyanate, 2,2',6,6'-tetramethyldiphenylmethane-4,4'-diisocyanate, diphenyl-4,4'-diisocyanate, diphenylether-4,4'-diisocyanate, 5-chlorotolylene-2,4-diisocyanate, 5-chlorotolylene-2,6-diisocyanate, 2,4-diisopropylphenylene-1,3-diisocyanate, m-xylene diisocyanate, p-xylene diisocyanate, $\alpha,\alpha,\alpha',\alpha'$-tetramethyl-p-xylene diisocyanate, 2,5-dichloro-p-xylene diisocyanate, tetra-chloro-p-phenylene-diisocyanate, tolylene-2,4-diisocyanate dimer, 1,5-naphthalene diisocyanate, hexamethylene diisocyanate, cyclohexane-1,4-diisocyanate, dicyclohexylmethane-4,4'-diisocyanate, 1,2,3,4,5,6-hexahydrodiphenylmethane-4,4'-diisocyanate and the like. Among them, polyisocyanate having at least two isocyanate groups are preferable in the production of polyoxazolidones. Particularly, aromatic diisocyanates and aromatic diisocyanate capped prepolymer of a hydroxyl terminated polymer, i.e., diisocyanate type prepolymers are more preferable and in this case tolylene diisocyanate is preferred.

The epoxy compounds to be used in the present invention are, for example, glycidyl ether compounds, such as phenylglycidyl ether, methylglycidyl ether, allylglycidyl ether, glycidyl methacrylate, HO—R'''—OH/epichlorohyrin condensate main chain structure type diepoxides (HO—R'''—OH shows the already mentioned glycols), epoxy polyolefin, such as partial epoxy compounds, of 1,2-bond type polybutadiene, alicyclic epoxy compounds, such as dicyclopentadiene oxide, dipentene dioxide, vinylcyclohexene oxide, 3,4-epoxy-cyclohexylmethyl-3',4'-epoxycyclohexane carboxylate, 3,4-epoxy-6-methylcyclohexyl-methyl-3',4'-epoxy-6'-methyl-cyclohexane carboxylate, novolak series epoxy compounds, such as polyorthocresolformaldehyde poly(2,3-epoxypropyl)ether, polyphenolformaldehyde poly(2,3-epoxypropyl)ether and the like. Among them, polyepoxides having at least two oxirane groups are preferable in the production of polyoxazolidone and bisphenol A diglycidyl ether is particularly preferable.

According to the process of the present invention, oxazolidone compounds can be obtained in a good selectivity and a high yield from an isocyanate compound and an epoxy compound and it is possible to obtain various compounds from a low molecular weight compound to a high molecular weight compound by selecting the combination of an isocyanate compound and an epoxy compound. In order to produce high molecular weight polyoxazolidones, a combination of a diepoxide and a diisocyanate is preferable. Furthermore, in the high molecular weight compound it is possible to obtain from rubbery compounds having a high mechanical strength to rigid resinous compounds having an excellent heat resistance. As mentioned above, when bisphenol A diglycidyl ether and a diisocyanate capped prepolymer of a hydroxyl terminated polymer are selected as epoxide and isocyanate respectively, polyoxazolidone showing an excellent rubbery elasticity and having physical properties which have never been obtained, that is, a breakage strength of not less than 200 Kg/cm$^2$ and an elongation at breakage of not less than 400%, can be produced. This will become apparent from Examples and Comparative Examples.

The catalysts of the present invention have a high solubility and therefore the handling is simple and the reaction reproductivity is very excellent. Moreover, in the bulk reaction, since the pot life is moderate, the workability for the reaction system is very excellent.

In the process of the present invention, the mixture ratio of the isocyanate compound and the epoxy compound is varied depending upon the object and is not limited but when high molecular weight oxazolidone compounds are to be produced from a diisocyanate compound and a diepoxy compound, the equivalent ratio of isocyanate group/epoxy group is 40/60 to 65/35, preferably 45/55 to 55/45.

The reaction temperature is 20°C to 250°C, preferably 90°C to 180°C.

The reaction may be effected in a bulk system in the absence of solvent or effected in the presence of a solvent which does not influence upon the reaction. Such solvents are polar solvents, such as aliphatic hydrocarbons, alicyclic hydrocarbons, aromatic hydrocarbons, halides, nitro compounds, ethers, dimethylformamides, dimethylsulfoxides thereof. Among them, benzene, toluene, xylene, o-dichlorobenzene, chlorobenzene, bromobenzene, tetralin, decalin, mesitylene, di-n-butyl ether, diisobutyl ether, diphenyl ether, nitrobenzene, dimethylformamide, dimethylsulfoxide and the like are preferable. A mold reaction system wherein no solvent bulk reaction is applied, can be advantageously adopted and in this case various features of the magnesium catalyst can be developed. For example, the product of a high molecular weight oxazolidone compound can be directly produced in a mold reaction system from a diepoxy compound and a diisocyanate compound and in this case, the necessary amount of the catalyst may be very small and the catalyst dissolves homogeneously in the reaction system and the pot life in the mold is sufficient and when the temperature is raised to an adequate reaction temperature, the reaction is completed in a short time and a molded product composed of a high molecular weight oxazolidone in a conversion rate of 100% can be produced.

The addition order is not particularly limited but in the case of bulk reaction, it is preferable in order to develop various features of the catalyst to dissolve the catalyst in the presence of an epoxy compound. The amount of the catalyst used varies depending upon the object and is not particularly limited and in general it is 0.05 to 10 mol percent, preferably 0.125 to 1.0 mol percent based on the total amount of isocyanate group equivalent and epoxy group equivalent.

The reaction system is preferred to be substantially anhydrous but the oxazolidone producing reaction is not completely stopped by admixture of a very small amount of water.

The reaction system may be under a dried air atmosphere but is preferred to be under a dried inert gas, such as nitrogen gas or argon gas.

The pressure condition in the reaction system is not particularly limited.

When the process of the present invention is applied to the production of a product composed of a high molecular weight oxazolidone compound from a low molecular weight epoxy compound and a low molecular weight isocyanate compound by a mold reaction system in a bulk reaction, various processes are adopted depending upon the object and the starting materials to be used. For example, pour press molding, transfer molding, injection molding, rotation molding, centrifugal casting, vacuum casting, plastic rubber process are cited.

Thus, various useful oxazolidone compounds can be obtained by the method of the present invention and the high molecular weight compounds can be applied for motorcar parts, buffer materials, medical materials, laminate materials, coating materials, heat resistant resin materials, foam materials, long lasting medicines, long lasting pesticides and the like and further they are foamed and used for various cushion materials, heat insulating materials and building materials. The low molecular weight compounds can be used for muscle relaxing agent, fungicides, plant growth accelerator, an agent for preventing Puccinia triticina ERIKS, food additives, extraction solvents for petroleum, and plasticizers.

The following examples are given for the purpose of illustration of this invention and are not intended as limitations thereof.

EXAMPLE 1

Preparation of the catalyst

Into an egg-plant type flask of 200 ml capacity were charged 1.43 g of magnesium chloride dried at 100°C for 3 days under vacuum, 5.38 g of hexamethylphosphoric triamide purified by a reduced pressure distillation (98° to 100°C/6 mm Hg) and 75 ml of benzene purified by a distillation after dehydration through Molecular Sieves 4A, and the resulting mixture was stirred and dissolved. The solution was subjected to a freeze-drying under a reduced pressure to obtain a white powdery hexamethylphosphoric triamide complex of magnesium chloride. Other catalyst systems of the present invention can be produced in the same procedure as described above.

EXAMPLE 2

Into a separable flask equipped with a stirrer and a three way stop-cock communicated to a vacuum line and a nitrogen line were charged 8.42 g of an epoxy resin having a molecular weight of about 380 and an epoxy equivalent of 184 to 194 (made by Shell Co., trademark: Epikote No. 828) and 0.12 g of the catalyst prepared in Example 1, and the resulting mixture was stirred and deaired at 100°C under a reduced pressure of 1 mm Hg. When the mixture was stirred for about 5 minutes, the catalyst was homogeneously dissolved in the epoxy resin. After the reaction system was brought up to atmospheric pressure with gaseous nitrogen, 55 g of a diisocyanate type prepolymer having isocyanate groups at both terminals and having an average molecular weight of about 2,000 and an isocyanate equivalent of about 1,000 (made by Du Pont Co., trademark: Adiprene L-100), was charged into the flask (the equivalent ratio of isocyanate group/epoxy group is 55/45). The resulting mixture was stirred and deaired at 60°C for about 5 minutes under a reduced pressure of 1 mm Hg to obtain a light yellow, transparent homogeneous mixture liquid containing no foam. The liquid maintained the original state even after 30 minutes. This shows that the liquid has a sufficiently long pot life. Then, the liquid was poured into a chromium-plated stainless steel mold previously heated at 70°C to 120°C by utilizing natural fluidity of the liquid. The mold was covered with a glass plate and left to stand for 5 hours in an oven kept at 150°C to obtain a light yellow, transparent high molecular weight rubbery slab sheet containing no foam.

In the infrared absorption spectrum of the sheet, both of the characteristic absorptions drawing]isocyanate group at 2,240 cm$^{-1}$ and of epoxy group at about 900 cm$^{-1}$ were not observed, while a characteristic absorption of oxazolidone group was observed at 1,750 cm$^{-1}$, but a characteristic absorption of isocyanurate ring at 1,700 cm$^{-1}$ was not observed [refer to (a) on the drawing]. As the result of the above infrared absorption spectrum analysis, it was confirmed that the reaction proceeded in a high selectivity and was completed in 100% conversion and a high molecular weight oxazolidone compound was formed. When the reaction at 150°C was traced with infrared absorption spectrum analysis, it was confirmed that the reaction was completed after 40 minutes from the beginning of the reaction.

Ring-shaped test samples having an inner diameter of 25 mm and a width of 2 mm were punched out from the above obtained slab sheet having a thickness of 2 mm, and physical properties of the sheet were measured with respect to the samples by means of an Instron tension tester to obtain the following results:

| | |
|---|---|
| Breakage strength (hereinafter abridged as $T_B$) | 302 Kg/cm$^2$ |
| Elongation at breakage (hereinafter abridged as $E_B$) | 506% |
| Initial modulus of elasticity (hereinafter abridged as E) | 85 Kg/cm$^2$ |
| 100% Modulus (hereinafter abridged as $M_{100}$) | 29 Kg/cm$^2$ |
| 300% Modulus (hereinafter abridged as $M_{300}$) | 55 Kg/cm$^2$ |

As described above, according to the process of the present invention, the reaction for producing oxazolidone compounds proceeds in a high selectivity and is completed in a very short time in the presence of a very small amount of catalyst by the reaction in mold, and as the result molded articles having an excellent mechanical strength as a rubbery elastomer can be obtained.

COMPARATIVE EXAMPLE 1

A hexamethylphosphoric triamide complex of lithium chloride, which is known as an excellent catalyst among conventional catalysts, was prepared in the following manner. In the same manner as described in Example 1, 65 ml of purified benzene, 2.12 g of purified lithium chloride and 13.8 g of purified hexamethylphosphoric triamide were charged into an egg-plant type flask of 200 ml capacity, and the resulting mixture was stirred and dissolved. Then, the resulting solution was subjected to a freeze-drying under a reduced pressure to obtain a white powdery hexamethylphosphoric triamide complex of lithium chloride.

Then, in the same manner as described in Example 2, 7.1 g of Epikote No. 828, 0.044 g of the above obtained lithium catalyst (this amount corresponds to the same molar concentration as the molar concentration of the magnesium catalyst in Example 2) and 40 g of Adiprene L-100 were treated, poured into a mold and left to stand for 5 hours in an oven kept at 150°C to obtain a rubbery slab sheet.

Physical properties of the resulting sheet measured in the same manner as described in Example 2 were as follows.

| | |
|---|---|
| $T_B$ | 77 Kg/cm² |
| $E_B$ | 714% |
| $M_{100}$ | 9 Kg/cm² |
| $M_{300}$ | 18 Kg/cm² |

As seen from the comparison of the physical properties of the sheets obtained in Example 2 and Comparative Example 1, mold articles having an excellent mechanical strength, which cannot be obtained by a conventional catalyst, can be obtained by the catalyst of the present invention.

Moreover, in the infrared absorption spectrum of the slab sheet obtained by using a conventional lithium series catalyst, the characteristic absorption of isocyanurate ring at 1,700 cm⁻¹ was observed in addition to that of oxazolidone group at 1,750 cm⁻¹ (refer to (b) on the drawing). This shows that isocyanate groups were mutually reacted to form a cyclized trimer as a by-product.

As seen from the comparison of the infrared absorption spectra of the sheets obtained in Example 2 and Comparative Example 1, oxazolidone compounds con-

EXAMPLES 3–9

The procedure described in Example 2 was repeated, except that the oven temperature and the time for keeping the mold in the oven were varied, to obtain light yellow, transparent rubbery slab sheets.

Conditions different from those in Example 2 and physical properties of the resulting sheets are shown in the following Table 1.

Table 1

| Example No. | Oven temperature (°C) | Time in oven (hr.) | Physical properties of slab sheet | | | | |
|---|---|---|---|---|---|---|---|
| | | | $T_B$ (Kg/cm²) | $E_B$ (%) | E (Kg/cm²) | $M_{100}$ (Kg/cm²) | $M_{300}$ (Kg/cm²) |
| 3 | 150 | 1 | 269 | 502 | 64 | 24 | 52 |
| 4 | " | 3 | 283 | 515 | 83 | 27 | 56 |
| 5 | " | 10 | 229 | 522 | 66 | 24 | 43 |
| 6 | " | 30 | 256 | 553 | 64 | 23 | 42 |
| 7 | 110 | 5 | 125 | 503 | 45 | 19 | 32 |
| 8 | 130 | 5 | 229 | 514 | 62 | 25 | 44 |
| 9 | 170 | 5 | 182 | 488 | 78 | 25 | 57 |

EXAMPLES 10–12

The procedure described in Example 2 was repeated, except that the amounts of Epikote No. 828 and Adiprene L-100, the oven temperature and the time for keeping the mold in the oven were varied, to obtain light yellow, transparent rubbery slab sheets.

Conditions different from those in Example 2 and physical properties of the resulting sheets are shown in the following Table 2.

Table 2

| Example No. | Epikote No. 828 (g) | Adiprene L-100 (g) | Equivalent ratio of isocyanate group / epoxy group | Oven temperature (°C) | Time in oven (hr.) | Physical properties of slab sheet | | | | |
|---|---|---|---|---|---|---|---|---|---|---|
| | | | | | | $T_B$ (Kg/cm²) | $E_B$ (%) | E (Kg/cm²) | $M_{100}$ (Kg/cm²) | $M_{300}$ (Kg/cm²) |
| 10 | 6.55 | 65.0 | 65/35 | 150 | 5 | 112 | 420 | 44 | 21 | 50 |
| 11 | 9.14 | 51.0 | 51/49 | 150 | 7 | 210 | 490 | 64 | 24 | 47 |
| 12 | 9.14 | 51.0 | 51/49 | 150 | 12 | 202 | 493 | 66 | 25 | 49 |

EXAMPLES 13 and 14

The procedure described in Examples 1 and 2 was repeated, except that the amounts of magnesium chloride (MgCl₂) and hexamethylphosphoric triamide (abridged as HMPA) and the amount of catalyst to be used were varied, to obtain light yellow, transparent rubbery slab sheets.

Conditions different from those in Example 2 and physical properties of the resulting sheets are shown in the following Table 3.

Table 3

| Example No. | MgCl₂ (g) | HMPA (g) | Amount of catalyst (g) | Physical properties of slab sheet | | | | |
|---|---|---|---|---|---|---|---|---|
| | | | | $T_B$ (Kg/cm²) | $E_B$ (%) | E (Kg/cm²) | $M_{100}$ (Kg/cm²) | $M_{300}$ (Kg/cm²) |
| 13 | 1.43 | 2.69 | 0.07 | 342 | 501 | 128 | 41 | 79 |
| 14 | 1.43 | 10.76 | 0.21 | 388 | 542 | 104 | 36 | 63 | taining a very small amount of by-products, which cannot be obtained by a conventional catalyst, can be obtained by the catalyst of the present invention.

EXAMPLES 15–17

Catalysts were prepared in the exactly same manner as described in Example 1, except that tri-n- butylphosphine oxide (abridged as TBPO), tri-2-ethyl-hexylphosphine oxide (abridged as TEHPO) or tri-phenylphosphine oxide (abridged as TPPO) was used instead of hexamethylphosphoric triamide. Then, the procedure described in Example 2 was repeated, except that the above obtained catalysts were used, to obtain light yellow, transparent rubbery slab sheets.

Conditions different from those in Example 2 and physical properties of the resulting sheets are shown in the following Table 4.

Table 4

| Example No. | $MgCl_2$ (g) | Ligand (g) | Name of ligand | Amount of catalyst (g) | Physical properties of slab sheet | | | | |
|---|---|---|---|---|---|---|---|---|---|
| | | | | | $T_B$ (Kg/cm²) | $E_B$ (%) | E (Kg/cm²) | $M_{100}$ (Kg/cm²) | $M_{300}$ (Kg/cm²) |
| 15 | 1.43 | 9.83 | TBPO | 0.2 | 346 | 520 | 79 | 35 | 59 |
| 16 | 1.43 | 3.54 | TEHPO | 0.13 | 117 | 410 | 52 | 21 | 51 |
| 17 | 1.43 | 12.50 | TPPO | 0.24 | 272 | 458 | 81 | 29 | 71 |

EXAMPLES 18–20

The catalyst obtained in Example 1 was mixed with 10% by weight based on the catalyst of water to prepare a hydrous catalyst. The procedure described in Example 2 was repeated, except that the above obtained hydrous catalyst was used and the heating temperature of the mold in the oven was varied, to obtain light yellow, transparent rubbery slab sheets.

Conditions different from those in Example 2 and physical properties of the resulting sheets are shown in the following Table 5.

Table 5

| Example No. | Hydrous catalyst (g) | Oven temperature (°C) | Time in oven (hr.) | Physical properties of slab sheet | | | | |
|---|---|---|---|---|---|---|---|---|
| | | | | $T_B$ (Kg/cm²) | $E_B$ (%) | E (Kg/cm²) | $M_{100}$ (Kg/cm²) | $M_{300}$ (Kg/cm²) |
| 18 | 0.13 | 130 | 5 | 162 | 448 | 59 | 24 | 49 |
| 19 | 0.13 | 150 | 5 | 234 | 484 | 66 | 26 | 54 |
| 20 | 0.13 | 170 | 5 | 101 | 418 | 57 | 22 | 50 |

As seen from Table 5, even when a catalyst system containing a small amount of water is used, the reaction proceeds.

EXAMPLES 21 and 22

The procedure described in Example 2 was repeated, except that the amount of catalyst to be used and the heating temperature of the mold in the oven were varied, to obtain light yellow, transparent rubbery slab sheets.

Conditions different from those in Example 2 and physical properties of the resulting sheets are shown in the following Table 6.

EXAMPLE 23

(A) Preparation of the prepolymer having isocyanate groups at both terminals from a glycol and a diisocyanate compound:

In a separable flask equipped with a stirrer and a three way stop-cock communicated to a vacuum line and a nitrogen line, polytetrahydrofuran main chain type glycol having a molecular weight of 3,510 was stirred at about 80°C for several hours under a reduced pressure of 1 mm Hg to remove water. Then, tolylene-2,4-diisocyanate was added to the glycol at about 70°C at one time in a ratio of 350 g of the diisocyanate per 3,150 g of the glycol. The resulting mixture was stirred for about 1 hour and further at 80°C for about 8 hours under nitrogen atmosphere, and left to stand for one night. The amount of the remaining isocyanate groups in the reaction product was analyzed with the amine equivalent method to confirm the formation of a prepolymer having isocyanate groups at both terminals and having an isocyanate equivalent of 2,030.

(B) In the same procedure as described in Example 2, 4.4 g of Epikote No. 828, 0.11 g of the catalyst prepared in Example 1 and 53.8 g of the above obtained diisocyanate type prepolymer (the equivalent ratio of isocyanate group/epoxy group is 53/47) were treated, poured into a mold and left to stand for 5 hours in an oven kept at 150°C to obtain a rubbery slab sheet.

Physical properties of the resulting sheet were as follows.

| | |
|---|---|
| $T_B$ | 222 Kg/cm² |
| $E_B$ | 540% |
| E | 99 Kg/cm² |
| $M_{300}$ | 38 Kg/cm² |

The infrared absorption spectrum in the range of

Table 6

| Example No. | Amount of catalyst (g) | Equivalent ratio of catalyst/(iso-cyanate group + epoxy group) | Oven temperature (°C) | Time in oven (hr.) | Physical properties of slab sheet | | | | |
|---|---|---|---|---|---|---|---|---|---|
| | | | | | $T_B$ (Kg/cm²) | $E_B$ (%) | E (Kg/cm²) | $M_{100}$ (Kg/cm²) | $M_{300}$ (Kg/cm²) |
| 21 | 0.06 | 1/800 | 150 | 5 | 259 | 510 | 64 | 25 | 49 |
| 22 | 0.24 | 1/200 | 130 | 5 | 227 | 522 | 50 | 19 | 33 |

1,800 cm⁻¹ to 1,600 cm⁻¹ of the resulting sheet was exactly same as the spectrum of the sheet obtained in Example 2 shown at (a) on the drawing (i.e., the characteristic absorption of oxazolidone group was observed at 1,750 cm$^{-1}$, but the characteristic absorption of isocyanurate ring at 1,700 cm$^{-1}$ was not observed), and further both of the characteristic absorptions of isocyanate group at 2,240 cm$^{-1}$ and of epoxy group at about 900 cm$^{-1}$ were not at all observed.

It was confirmed from this fact that the reaction proceeded in a high selectivity and was completed, and a high molecular weight oxazolidone compound was formed.

COMPARATIVE EXAMPLE 2

A polyoxazolidone was prepared in the following manner by using tri-n-propylethylammonium iodide, which is known as a fairly active catalyst among conventional catalysts.

In the same procedure as described in Example 23, 0.075 g of the above described quaternary ammonium salt catalyst was added to 7.1 g of Epikote No. 828, and the resulting mixture was stirred and mixed at 60°C to 70°C under a reduced pressure. Then, 62 g of the diisocyanate type prepolymer obtained in Example 23(A) was added thereto, and the resulting mixture was stirred at 60°C to 70°C under a reduced pressure to effect mixing and deairing simultaneously. [When the mixture was treated at the same temperature as that of Example 23(B), the treated mixture had a very short pot life, and gelled in a very short period of time, and it was often impossible to pour the treated mixture.] Then, the reaction system was brought up to atmospheric pressure with gaseous nitrogen, and the above treated mixture was poured into a mold previously heated at 60°C to 70°C, and the mold was left to stand for 5 hours in an oven kept at 170°C to permit a reaction to proceed and to obtain a rubbery slab sheet. (When the oven temperature is 150°C, the reaction rate is very low.)

Physical properties of the resulting sheet were as follows.

| | |
|---|---|
| $T_B$ | 127 Kg/cm$^2$ |
| $E_B$ | 487% |
| E | 38 Kg/cm$^2$ |
| $M_{300}$ | 9 Kg/cm$^2$ |

In the infrared absorption spectrum of the resulting slab sheet, the characteristic absorption of isocyanurate ring at 1,700 cm$^{-1}$ was observed in addition to that of oxazolidone group at 1,750 cm$^{-1}$ (refer to (c) on the drawing). This shows that isocyanate groups were mutually reacted to form a cyclized trimer as a by-product.

As seen from the comparison of Example 23 and Comparative Example 2, molded articles containing a very small amount of by-products and having excellent physical properties, which cannot be obtained by a conventional catalyst, can be obtained by the catalyst of the present invention.

EXAMPLES 24–27

The procedure described in Example 23(B) was repeated, except that the amounts of Epikote No. 828 and the diisocyanate type prepolymer were varied, to obtain rubbery slab sheets.

Conditions different from those in Example 23(B) and physical properties of the resulting sheets are shown in the following Table 7.

Table 7

| Example No. | Epikote No. 828 (g) | Prepolymer (g) | Physical properties of slab sheet | | | |
|---|---|---|---|---|---|---|
| | | | $T_B$ (Kg/cm$^2$) | $E_B$ (%) | E (Kg/cm$^2$) | $M_{300}$ (Kg/cm$^2$) |
| 24 | 4.76 | 49.7 | 307 | 620 | 245 | 50 |
| 25 | 4.58 | 51.7 | 334 | 620 | 235 | 59 |
| 26 | 4.20 | 56.8 | 298 | 540 | 333 | 69 |
| 27 | 4.02 | 57.8 | 269 | 510 | 484 | 92 |

EXAMPLES 28–32

A prepolymer having isocyanate groups at both ends was prepared in the same manner as described in Example 23(A), except that polytetrahydrofuran main chain type glycol having a molecular weight of 2,060 was used as a polymer glycol. The resulting prepolymer had an isocyanate equivalent of 1,230. Then, the procedure described in Example 23(B) was repeated, except that the above obtained prepolymer was used, and the mixing ratio of the prepolymer and Epikote No. 828 was varied, to obtain rubbery slab sheets.

Conditions different from those in Example 23(B) and physical properties of the resulting sheets are shown in the following Table 8.

Table 8

| Example No. | Epikote No. 828 (g) | Prepolymer (Mw 2060) (g) | Equivalent ratio of isocyanate group epoxy group | Physical properties of slab sheet | | | |
|---|---|---|---|---|---|---|---|
| | | | | $T_B$ (Kg/cm$^2$) | $E_B$ (%) | E (Kg/cm$^2$) | $M_{300}$ (Kg/cm$^2$) |
| 28 | 9.5 | 60.2 | 49/51 | 168 | 522 | 72 | 58 |
| 29 | 9.2 | 62.6 | 51/49 | 182 | 550 | 63 | 44 |
| 30 | 8.8 | 65.1 | 53/47 | 172 | 482 | 63 | 57 |
| 31 | 8.4 | 67.5 | 55/45 | 205 | 520 | 63 | 53 |
| 32 | 8.0 | 70.0 | 57/43 | 152 | 500 | 87 | 55 |

EXAMPLE 33

The procedure described in Example 25 was repeated, except that 2.6 g of tolylene-2,4-diisocyanate and 51.7 g of the prepolymer prepared in Example 23(A) were used as diisocyanate compounds, and 10.13 g of Epikote No. 828 was used as diepoxy compound, to obtain a rigid elastic slab sheet.

Physical properties of the resulting sheet were as follows.

| | |
|---|---|
| $T_B$ | 157 Kg/cm² |
| $E_B$ | 360% |
| E | 612 Kg/cm² |
| $M_{300}$ | 133 Kg/cm² |

EXAMPLE 34

In a separable flask of 300 ml capacity, 0.16 g of the hexamethylphosphoric triamide complex of magnesium chloride prepared in Example 1 and 11.0 g of Epikote No. 828 were mixed at 90°C under vacuum while stirring to prepare a homogeneous solution. After the reaction system was brought up to atmospheric presure with gaseous nitrogen, 50 g of Adiprene L-100 was added to the solution, and the resulting mixture was again stirred and deaired under vacuum. After the reaction system was brought up to atmospheric pressure with gaseous nitrogen, 1.5 ml of tolylene-2,4-diisocyanate was added to the above deaired mixture, and then the resulting mixture was again deaired at room temperature under a reduced pressure, and poured into a chromium-plated stainless steel mold having a depth of 2 mm, which had previously been heated at about 70°C. The mold was covered with a glass plate and left to stand for 5 hours in an oven kept at 150°C to obtain a light yellow, transparent rubbery slab sheet. Ring-shaped test samples having an inner diameter of 25 mm and a width of 2 mm were punched out from the sheet, and physical properties of the sheet were measured with respect to the samples by means of an Instron tension tester to obtain the following results.

| | |
|---|---|
| $T_B$ | 303 Kg/cm² |
| $E_B$ | 506% |
| E | 167 Kg/cm² |
| $M_{100}$ | 46 Kg/cm² |
| $M_{300}$ | 90 Kg/cm² |

Further, the sheet had a JIS hardness of 80 and a melting point of 240°C to 250°C.

EXAMPLE 35

The procedure described in Example 34 was repeated, except that 0.22 g of the catalyst, 14.9 g of Epikote No. 828, 40 g of Adiprene L-100 and 4.0 ml of tolyylene2,4-diisocyanate were used, to obtain a light yellow, transparent rigid elastic slab sheet. Physical properties of the sheet were as follows.

| | |
|---|---|
| $T_B$ | 300 Kg/cm² |
| $E_B$ | 340% |
| E | 887 Kg/cm² |

Further, the sheet had a JIS hardness of 91 and a melting point of higher than 300°C.

EXAMPLE 36

The procedure described in Example 34 was repeated, except that 0.26 g of the catalyst, 17.6 g of Epikote No. 828, 30 g of Adiprene L-100 and 5.9 ml of tolylene-2,4-diisocyanate were used, to obtain a light yellow, transparent elastic resinous slab sheet. Physical properties of the sheet were as follows.

| | |
|---|---|
| $T_B$ | 241 Kg/cm² |
| $E_B$ | 163% |
| E | 1,920 Kg/cm² |

Further, the sheet had a JIS hardness of 93 and a melting point of higher than 300°C.

EXAMPLE 37

The procedure described in Example 34 was repeated, except that 0.42 g of the catalyst, 28.9 g of Epikote No. 828, 20 g of Adiprene L-100 and 11.9 ml of tolylene-2,4-diisocyanate were used, to obtain a light yellow, transparent resinous slab sheet. The sheet had a JIS hardness of 95 and a melting point of higher than 300°C and did not substantially change its shape at 300°C. Therefore, the sheet was a resin having an excellent heat resistance.

EXAMPLE 38

The procedure described in Example 34 was repeated, except that 0.12 g of catalyst, 7.8 g of DER No. 736 (trademark of a polypropylene oxide main chain type diepoxide made by Dow Co.) instead of Epikote No. 828 and 50 g of Adiprene L-100 were used, but tolylene-2,4-diisocyanate was not used, to obtain a light yellow, transparent rubbery slab sheet.

EXAMPLE 39

The procedure described in Example 34 was repeated, except that 0.12 g of the catalyst, 2.5 g of Chissonox No. 206 (trademark of vinylcyclohexene diepoxide made by ChissoUCC Co.) instead of Epikote No. 828 and 40 g of Adiprene L-100 were used, but tolyelen-2,4-diisocyanate was not used, to obtain a light yellow, transparent flexible slab sheet.

What is claimed is:

1. A process for preparing an oxazolidone polymer which comprises reacting a polyisocyanate with a polyepoxide, the equivalent ratio of isocyanate groups of said polyisocyanate to epoxide groups of said polyepoxide being 40/60 to 65/35 at a temperature of 20°C to 250°C in the presence of a magnesium halide/phosphine oxide complex having the following formula

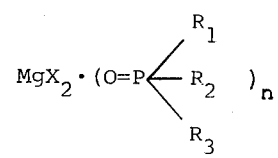

in which X is a halogen atom, $R_1$, $R_2$ and $R_3$ are selected from the group consisting of an aliphatic and aromatic hydrocarbon and an amine which is disubstituted by an aliphatic hydrocarbon, containing from one to 20, inclusive, carbon atoms; $n$ is 1, 2, 3 or 4, the amount of said magnesium halide/phosphine oxide complex being 0.05 to 10 mol percent of the amount of said polyepoxide and said polyisocyanate.

2. A process according to claim 1, in which said magnesium halide is magnesium chloride.

3. A process according to claim 1, in which said phosphine oxide is any one of hexamethylphosphoric triamide, tri-n-butyl phosphine oxide and triphenyl phosphine oxide.

4. A process according to claim 1, in which said magnesium halide/phosphine oxide complex is a complex compound selected from the group consisting of magnesium chloride/hexamethylphosphoric triamide complex, magnesium chloride/tri-n-butylphosphine oxide complex, magnesium chloride/tri-n-ethylhexylphosphine oxide complex, and magnesium chloride/triphenylphosphine oxide complex.

5. A process according to claim 1, in which said polyisocyanate has at least two isocyanate groups.

6. A process according to claim 5, in which said polyisocyanate is a diisocyanate capped prepolymer of a hydroxyl terminated polymer wherein said diisocyanate is an aromatic diisocyanate.

7. A process according to claim 6, in which said diisocyanate is tolylene diisocyanate.

8. A process according to claim 1, in which said polyepoxide has at least two oxirane groups.

9. A process according to claim 1, in which said polyepoxide is a diepoxide and said polyisocyanate is a diisocyanate.

10. A process according to claim 1, in which said polyepoxide is a bisphenol A diglycidyl ether.

11. Polyoxazolidone polymers having a breakage strength of not less than 200 kg/cm² and an elongation at breakage of not less than 400% prepared by reacting (a) bisphenol A diglycidyl ether and (b) tolylene diisocyanate capped prepolymer of hydroxyl terminated polyether glycol, the equivalent ratio of isocyanate groups of said tolylene diisocyanate capped prepolymer (b) to epoxide groups of said bisphenol A diglycidyl ether (a) being 40/60 to 65/35, at a temperature of 20°–250°C in the presence of a magnesium halide/phosphine oxide complex having the following formula

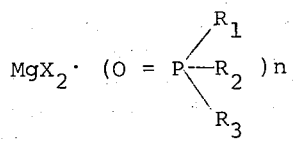

in which X is a halogen atom, $R_1$, $R_2$ and $R_3$ are selected from the group consisting of an aliphatic and aromatic hydrocarbon and an amine which is disubstituted by an aliphatic hydrocarbon, containing from one to 20, inclusive, carbon atoms; $n$ is 1, 2, 3 or 4, the amount of said magnesium halide/phosphine oxide complex being 0.05 to 10 mol percent of the amount of said polyepoxide and said polyisocyanate.

* * * * *